(12) United States Patent
Cuzzort et al.

(10) Patent No.: US 8,266,163 B2
(45) Date of Patent: Sep. 11, 2012

(54) UTILIZING REFERENCE/ID LINKING IN XML WRAPPER CODE GENERATION

(75) Inventors: Stephen F. Cuzzort, Hixson, TN (US); Samuel Epstein, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1234 days.

(21) Appl. No.: 12/037,750

(22) Filed: Feb. 26, 2008

(65) Prior Publication Data

US 2009/0216797 A1    Aug. 27, 2009

(51) Int. Cl.
*G06F 17/30* (2006.01)
*G06F 7/00* (2006.01)

(52) U.S. Cl. ......... 707/756; 707/769; 707/803; 715/513

(58) Field of Classification Search .................. None
See application file for complete search history.

(56) References Cited

U.S. PATENT DOCUMENTS

2005/0154978 A1* 7/2005 Albornoz et al. ............. 715/513
2006/0041838 A1* 2/2006 Khan ............................ 715/513

* cited by examiner

*Primary Examiner* — Loan T Nguyen
(74) *Attorney, Agent, or Firm* — Cuenot, Forsythe & Kim, LLC

(57) ABSTRACT

Utilizing reference/identification (ID) linking in extensible markup language (XML) wrapper code generation in a data processing system. A code generator receives a type document and reference/ID constraints document and accesses the reference/ID constraints document to translate between XML structures and object structures.

15 Claims, 3 Drawing Sheets

UTILIZING REFERENCE/ID LINKING IN XML WRAPPER CODE GENERATION

BACKGROUND OF THE INVENTION

The present disclosure relates to the field of computers, and specifically to software. Still more specifically, the present disclosure relates to efficient generation of computer instructions.

BRIEF SUMMARY OF THE INVENTION

A method for utilizing reference/identification (ID) linking in extensible markup language (XML) wrapper code generation in a data processing system is presented. A code generator receives a type document and reference/ID constraints document and accesses the reference/ID constraints document to translate between XML structures and object structures.

DETAILED DESCRIPTION OF THE INVENTION

Figure 1:
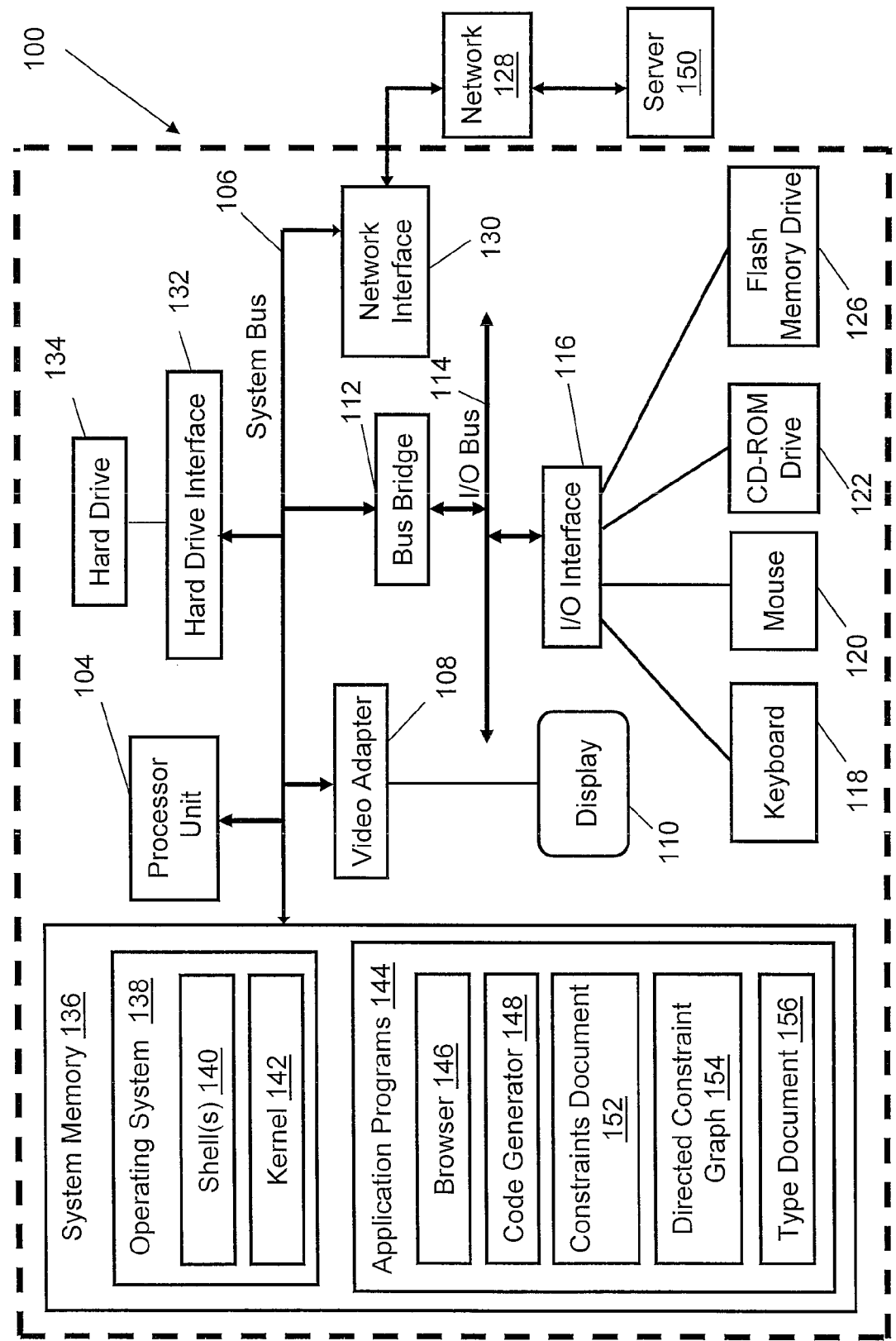
FIG. 1 depicts an exemplary network in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (Java is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. While such programs are exemplary in nature, any language that complies with Turing Completeness (i.e., is a machine capable of executing instructions, calculations and similar programmable processes) may utilized by the present invention. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the United States and other countries) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also includes a code generator 148, type document 156, reference/ID constraints document 152, and directed constraint graph 154. Code generator 148 performs the functions described below in FIGS. 2-3.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
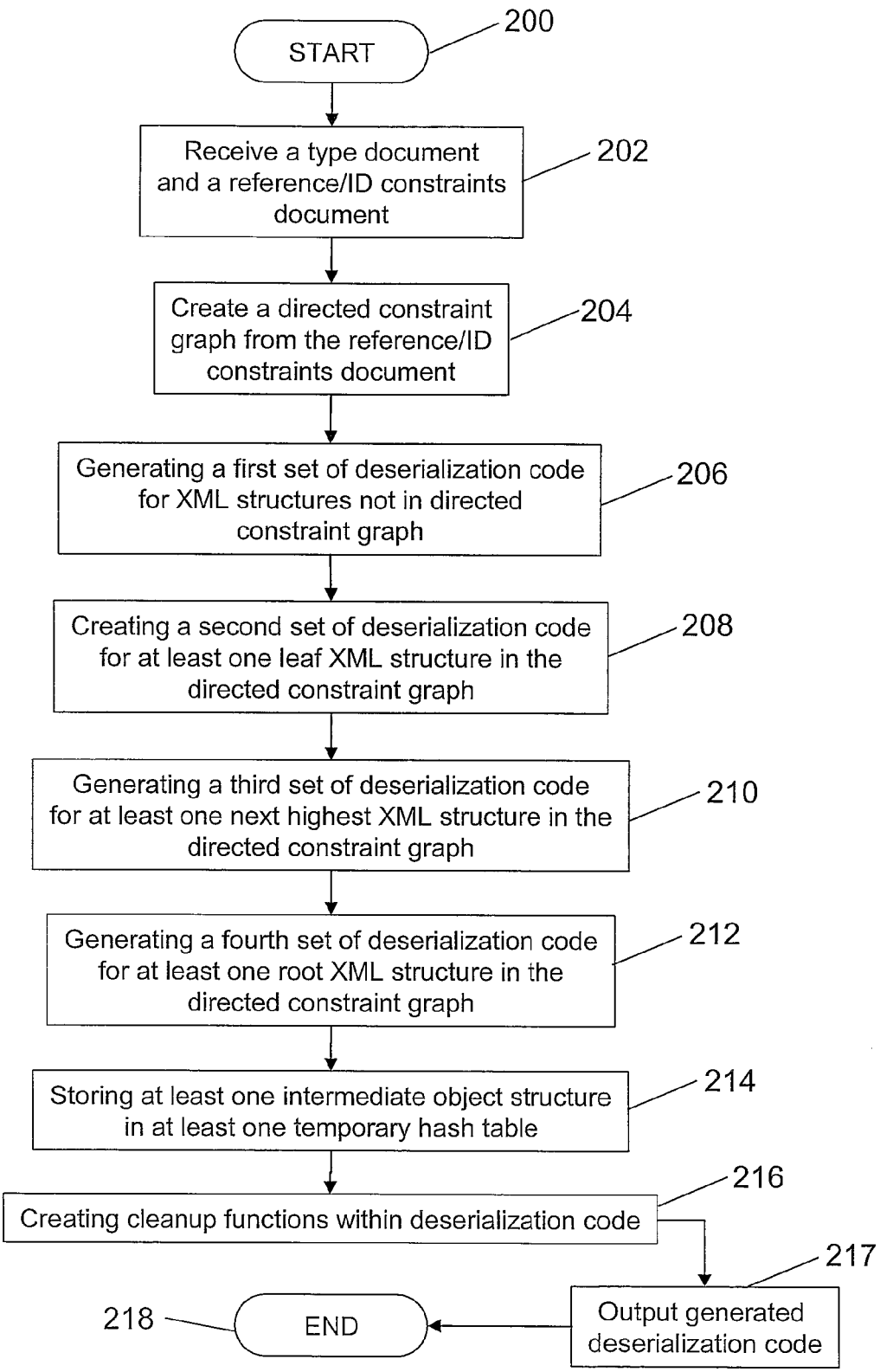
FIG. 2 is a high-level flow-chart of exemplary steps taken to utilize the data processing system to generate deserialization code utilizing reference/ID linking according to an embodiment of the present invention.

FIG. 2 is a high-level logical flowchart illustrating an exemplary method for implementing deserialization code generation utilizing reference/ID linking according to an embodiment of the present invention. The process begins at step 200 and proceeds to step 202, which illustrates code generator 148 receiving a type document 156 (FIG. 1) that includes XML code and reference/ID constraints document 152 (FIG. 1) that specifies the reference/ID constraints of the XML code in type document 156. The process continues to step 204, which illustrates code generator 148 (FIG. 1) creating a directed constraint graph 154 (FIG. 1).

The process continues to step 206, which illustrates code generator 148 (FIG. 1) generating a first set of deserialization code for XML structures that are not in directed constraint graph 154 (FIG. 1). The process proceeds to step 208, which shows code generator 148 (FIG. 1) creating a second set of deserialization code for at least one leaf XML structure in the directed constraint graph. According to an embodiment of the present invention, a leaf XML structure is an XML structure that does not reference any other XML structure in the directed constraint graph.

The process continues to step 210, which depicts code generator 148 (FIG. 1) generating a third set of deserialization code for at least one next highest XML structure in the directed constraint graph. According to an embodiment of the present invention, the next highest XML structure is an XML structure that is not a leaf XML structure or a root XML structure in the directed constraint graph.

The process proceeds to step 212, which illustrates code generator 148 (FIG. 1) generating a fourth set of deserialization code for the root XML structure in the directed constraint graph. According to an embodiment of the present invention, a root XML structure is a structure that does not referenced by any other XML structure. The process continues to step 214, which shows code generator 148 (FIG. 1) storing at least one intermediate object structure in at least one temporary hash table. The intermediate object structures will be stored in temporary hash tables for lookup by parent object structures in the directed constraint graph.

The process proceeds to step 216, which illustrates code generator 148 (FIG. 1) creating cleanup functions within the deserialization code, with removes all temporary hash tables used in the object deserialization. The process continues to step 217, which shows code generator 148 (FIG. 1) outputting the generated deserialization code. The process ends, as shown in step 218.

Figure 3:
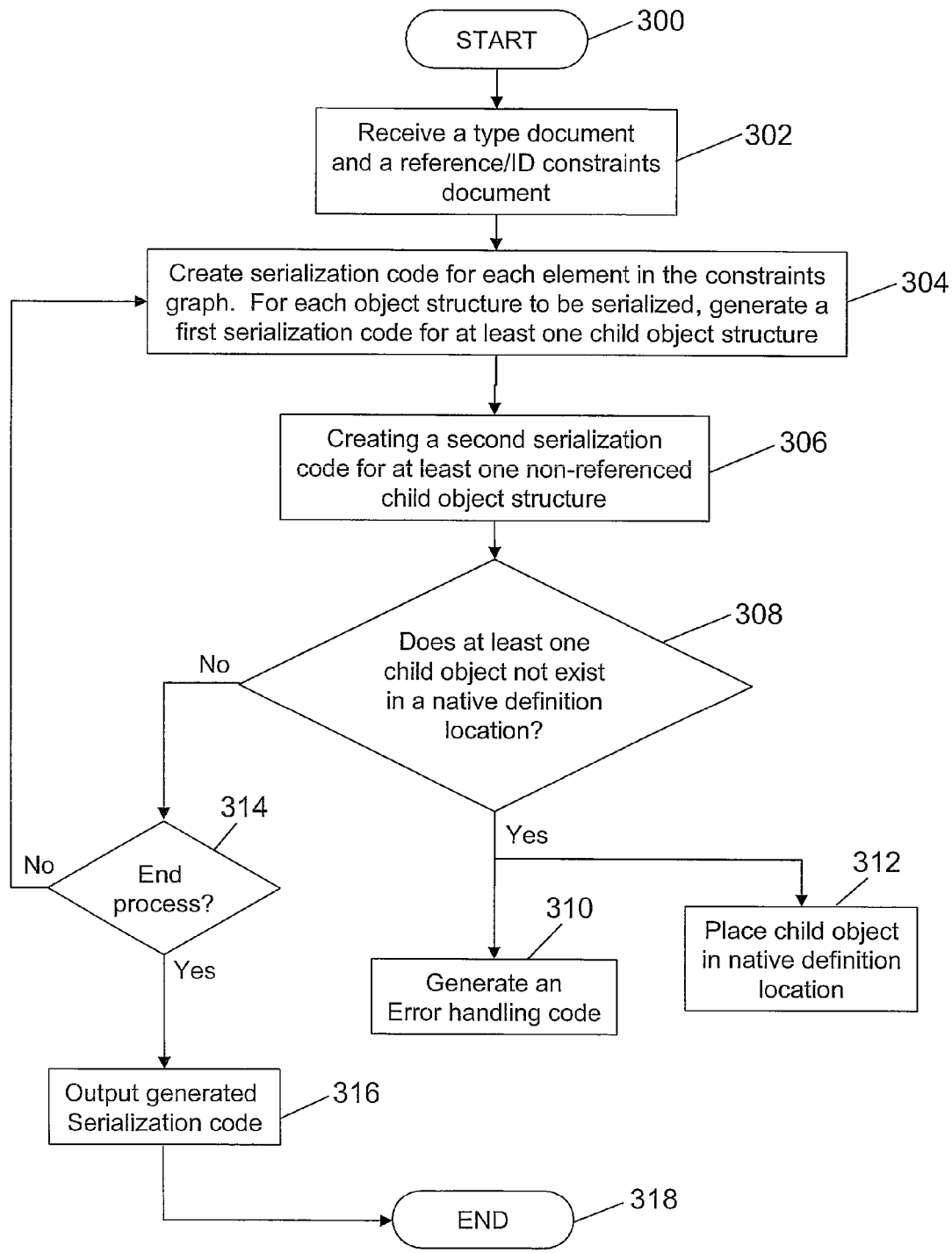
FIG. 3 is a high-level flow-chart of exemplary steps taken to utilize the data processing system to generate serialization code utilizing reference/ID linking according to an embodiment of the present invention.

FIG. 3 is a high-level logical flowchart illustrating an exemplary method for implementing serialization code generation utilizing reference/ID linking according to an embodiment of the present invention. The process begins at step 300 and continues to step 302, which illustrates code generator 148 (FIG. 1) receiving type document 156 (FIG. 1) and reference/ID constraints document 152 (FIG. 1). The process continues to step 304, which illustrates code generator 148 (FIG. 1) generating a first serialization code for at least one child object structure for each object structure to be serialized and creating serialization code for each element in the constrains graph. Only identifying attributes of the child object structure into the parent object structure's XML structure. The process proceeds to step 306, which illustrates code generator 148 (FIG. 1) creating a second serialization code for at least one non-referenced child object structure.

The process continues to step 308, which illustrates code generator 148 (FIG. 1) determining if at least one child object does not exits in a native definition location. If not, the process continues to step 314, which illustrates code generator 148 (FIG. 1) determining if the process should end. If not, the process returns to step 304. If so, code generator 148 outputs the generated serialization code, as illustrated in step 316 and the process ends, as shown in step 318.

Returning to step 308, if code generator 148 (FIG. 1) determines that at least one child object does not exists in a native definition location, the process continues to steps 310 and 312, which illustrate code generator 148b (FIG. 1) generating an error handling code and/or placing the child object in the native definition location. The process continues to step 314.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Note further that while the present invention has been described in reference to references/ID constraints in XML code, the above described invention may similarly be utilized to reference any file, including database files, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for utilizing reference/identification (ID) linking in extensible markup language (XML) wrapper code generation in a data processing system, said method comprising:
   receiving a type document and reference/ID constraints document; and
   accessing said reference/ID constraints document to translate between XML structures and object structures, wherein said accessing includes:
      creating a directed constraint graph from said reference/ID constraints document, wherein said directed constraint graph comprises at least one root XML structure that is not referenced by other XML structures and at least one leaf XML structure that does not reference other XML structures;
      generating a first set of deserialization code for at least one XML structure not in said directed constraint graph, wherein said first set of deserialization code translates said at least one XML structure not in said directed constraint graph into at least one object structure not in said directed constraint graph;
      creating a second set of deserialization code for said at least one XML leaf structure in said directed constraint graph, wherein said second set of deserialization code translates said at least one leaf XML structure into at least one leaf object structure;
      generating a third set of deserialization code for at least one next highest XML structure in said directed constraint graph, wherein said third set of deserialization code translates said at least one next highest XML structure into at least one next highest object structure;
      storing at least one intermediate object structure in at least one temporary hash table, wherein said at least one intermediate object structure is not a root object structure or a leaf object structure; and
      creating cleanup functions within said first, second, and third sets of deserialization code, wherein said cleanup functions remove all temporary hash tables utilized in object serialization.

2. The method according to claim 1, further comprising:
   generating a fourth set of deserialization code for said at least one root XML structure, wherein said fourth set of deserialization code translates said at least one root XML structure into at least one object root structure.

3. The method according to claim 1, wherein said accessing further comprises:
   for at least a first object structure to be serialized, generating a first serialization code for at least one child object structure, wherein only an identifying attribute of said at least one child object structure is serialized into an XML structure of said at least first object structure; and
   creating a second serialization code for at least one non-referenced child object.

4. The method according to claim 3, further comprising:
   in response to determining said at least one child object structure does not exist in a native definition location, generating an error handling code.

5. The method according to claim 3, further comprising:
   in response to determining said at least one child object structure does not exist in a native definition location, automatically adding said at least one child object structure to said native definition location.

6. A data processing system for utilizing reference/identification (ID) linking in extensible markup language (XML) wrapper code generation in a data processing system, said data processing system comprising:

a processor;
an interconnect coupled to said processor; and
a computer-readable storage medium embodying computer program code, said computer program code comprising instructions executable by said processor and configured for:
receiving a type document and reference/ID constraints document; and
accessing said reference/ID constraints document to translate between XML structures and object structures, wherein said instructions for accessing further include instructions configured for:
creating a directed constraint graph from said reference/ID constraints document, wherein said directed constraint graph comprises at least one root XML structure that is not referenced by other XML structures and at least one leaf XML structure that does not reference other XML structures;
generating a first set of deserialization code for at least one XML structure not in said directed constraint graph, wherein said first set of deserialization code translates said at least one XML structure not in said directed constraint graph into at least one object structure not in said directed constraint graph;
creating a second set of deserialization code for said at least one XML leaf structure in said directed constraint graph, wherein said second set of deserialization code translates said at least one leaf XML structure into at least one leaf object structure;
generating a third set of deserialization code for at least one next highest XML structure in said directed constraint graph, wherein said third set of deserialization code translates said at least one next highest XML structure into at least one next highest object structure;
storing at least one intermediate object structure in at least one temporary hash table, wherein said at least one intermediate object structure is not a root object structure or a leaf object structure; and
creating cleanup functions within said first, second, and third sets of deserialization code, wherein said cleanup functions remove all temporary hash tables utilized in object serialization.

7. The system according to claim 6, wherein said instructions are further configured for:
generating a fourth set of deserialization code for said at least one root XML structure, wherein said fourth set of deserialization code translates said at least one root XML structure into at least one object root structure.

8. The system according to claim 6, wherein said instructions for accessing are further configured for:
for at least a first object structure to be serialized, generating a first serialization code for at least one child object structure, wherein only an identifying attribute of said at least one child object structure is serialized into an XML structure of said at least first object structure; and
creating a second serialization code for at least one non-referenced child object.

9. The system according to claim 8, wherein said instructions are further configured for:
in response to determining said at least one child object structure does not exist in a native definition location, generating an error handling code.

10. The system according to claim 8, wherein said instructions are further configured for:
in response to determining said at least one child object structure does not exist in a native definition location, automatically adding said at least one child object structure to said native definition location.

11. A computer program product comprising computer usable storage device having stored therein computer usable program code for utilizing reference/identification (ID) linking in extensible markup language (XML) wrapper code generation the computer usable program code, which when executed by a computer hardware system, causes the computer hardware system to perform:
receiving a type document and reference/ID constraints document; and
accessing said reference/ID constraints document to translate between XML structures and object structures, wherein said accessing includes:
creating a directed constraint graph from said reference/ID constraints document, wherein said directed constraint graph comprises at least one root XML structure that is not referenced by other XML structures and at least one leaf XML structure that does not reference other XML structures;
generating a first set of deserialization code for at least one XML structure not in said directed constraint graph, wherein said first set of deserialization code translates said at least one XML structure not in said directed constraint graph into at least one object structure not in said directed constraint graph;
creating a second set of deserialization code for said at least one XML leaf structure in said directed constraint graph, wherein said second set of deserialization code translates said at least one leaf XML structure into at least one leaf object structure;
generating a third set of deserialization code for at least one next highest XML structure in said directed constraint graph, wherein said third set of deserialization code translates said at least one next highest XML structure into at least one next highest object structure;
storing at least one intermediate object structure in at least one temporary hash table, wherein said at least one intermediate object structure is not a root object structure or a leaf object structure; and
creating cleanup functions within said first, second, and third sets of deserialization code, wherein said cleanup functions remove all temporary hash tables utilized in object serialization.

12. The computer program product according to claim 11, wherein the computer usable program code further causes the computer hardware system to perform:
generating a fourth set of deserialization code for said at least one root XML structure, wherein said fourth set of deserialization code translates said at least one root XML structure into at least one object root structure.

13. The computer program product according to claim 11, wherein said computer usable program code further causes the computer hardware system to perform:
for at least a first object structure to be serialized, generating a first serialization code for at least one child object structure, wherein only an identifying attribute of said at least one child object structure is serialized into an XML structure of said at least first object structure; and
creating a second serialization code for at least one non-referenced child object.

14. The computer program product according to claim 13, wherein the computer usable program code further causes the computer hardware system to perform:

in response to determining said at least one child object structure does not exist in a native definition location, generating an error handling code.

15. The computer program product according to claim 13, wherein the computer usable program code further causes the computer hardware system to perform:

in response to determining said at least one child object structure does not exist in a native definition location, automatically adding said at least one child object structure to said native definition location.

* * * * *